United States Patent
Shimomura et al.

(10) Patent No.: US 7,362,954 B2
(45) Date of Patent: Apr. 22, 2008

(54) RECORDING APPARATUS AND METHOD, RECORDING MEDIUM, AND PROGRAM

(75) Inventors: Munehiro Shimomura, Kanagawa (JP); Hiroki Matsui, Kanagawa (JP); Takuji Himeno, Chiba (JP); Fumiyoshi Abe, Kanagawa (JP)

(73) Assignee: Sony Corporation (JP)

( * ) Notice: Subject to any disclaimer, the term of this patent is extended or adjusted under 35 U.S.C. 154(b) by 874 days.

(21) Appl. No.: 10/688,434

(22) Filed: Oct. 17, 2003

(65) Prior Publication Data

US 2004/0091247 A1 May 13, 2004

(30) Foreign Application Priority Data

Nov. 12, 2002 (JP) .................. 2002-328330 U

(51) Int. Cl.
- H04N 5/91 (2006.01)
- H04N 9/80 (2006.01)
- H04N 11/02 (2006.01)
- H04N 9/79 (2006.01)
- H04N 9/00 (2006.01)
- H04N 7/00 (2006.01)

(52) U.S. Cl. ............................ 386/95; 386/27; 386/33; 386/40; 386/46; 386/39; 386/104; 386/124; 360/77.14

(58) Field of Classification Search ................. 386/95, 386/27, 33, 39, 124, 40, 46, 68, 98, 99, 100, 386/104, 109, 120, 125, 126; 360/77.14
See application file for complete search history.

(56) References Cited

U.S. PATENT DOCUMENTS

| | | | |
|---|---|---|---|
| 5,857,058 A * | 1/1999 | Iwamoto et al. | 386/109 |
| 5,878,187 A * | 3/1999 | Kubota et al. | 386/95 |
| 6,393,206 B1 * | 5/2002 | Yagi et al. | 386/125 |
| 7,046,479 B2 * | 5/2006 | Shibata | 360/77.14 |
| 2001/0055473 A1 * | 12/2001 | Tauchi et al. | 386/95 |
| 2003/0072561 A1 * | 4/2003 | Terada | 386/95 |

FOREIGN PATENT DOCUMENTS

| | | |
|---|---|---|
| JP | 02-035878 | 2/1990 |
| JP | 2001-291335 A | 10/2001 |

* cited by examiner

Primary Examiner—Thai Q. Tran
Assistant Examiner—Syed Y. Hasan
(74) Attorney, Agent, or Firm—Lerner, David, Littenberg, Krumholz & Mentlik, LLP

(57) ABSTRACT

When the head of a data pack that can be a start point of consecutive recording is included in an ECC (error correcting code) bank, data indicating this is set in an ECCTB (error correctly code two-B picture). When the head of a data pack that can be a start point of consecutive recording is not included in the ECC bank, data indicating this is set in the ECCTB. Thus, when performing consecutive recording, a recording apparatus refers to contents of the ECCTBs to detect a consecutive recording start, thereby allowing selection of the point closest to a point where a user desires to start consecutive recording, and the user starts the consecutive recording at the detected point.

6 Claims, 9 Drawing Sheets

FIG. 5

| Item | Number of bytes | Contents |
|---|---|---|
| ECCTB Packet Header | 1 | DATA=80 |
| Length(packet data) | 1 | DATA=93 |
| SubCord information | | Same content as SubCord of ECC first track |
|   ATNF(FLE+ATN+FLG) | 5 | Value of ECC first track is recorded |
|   Extend Track Number | 3 | Same as above |
|   TTC | 5 | Same as SubCord of ECC first track |
|   Binary group | 5 | Written in same SubCord as TTC |
|   data/time original | 10 | Original data and time unchanged even by copying |
|   data/time main | 8 | (Used for display) |
|   generation number | 1 | Increments by +1 each time Last modify is updated |
| | | |
| EDITABLE HEADER MAP | | 25 |
|   Picture_Number_from_I-pic | 1 | Number of frames from immediately preceding I-pic is entered |
|   1st Editable Header | | |
|     DATA-H | 1 | PES-Video |
|     VBV delay | 2 | |
|     header size | 1 | For correction of VBV delay header size difference |
|     DTS | 5 | |
|     Continuity counter | 1 | b7-4:audio, b3-0:video |
|     Position(SB) | 1 | AUD-Frame Pocket (AUX position for edit) |
|     Position(track) | 1 | |
|   2nd Editable Header | | |
|     DATA-H | 1 | PES-Video |
|     VBV delay | 2 | |
|     heater size | 1 | For correction of VBV delay header size difference |
|     DTS | 5 | |
|     Continuity counter | 1 | b7-4:audio, b3-0:video |
|     Position(SB) | 1 | Audio AUX (head data position for 2nd edit) |
|     Position(track) | 1 | |
| Edit status ECC | 1 | 0 at edit point, counting up to 7f for each ECC |
| SEARCH DATA mode | 1 | Seach REC pattern |
| Search PCS | 1 | Indicates search data recording information |
| Search data block number | 1 | x8 speed data division number (1 to 9) 00,FF:no info. |
| video mode | 16 | Same content as VID-frame audio mode |
| audio mode | 10 | Same content as AUD-frame video mode |
| Reserved | 1 | |
| | | |
| TOTAL | 95 | |

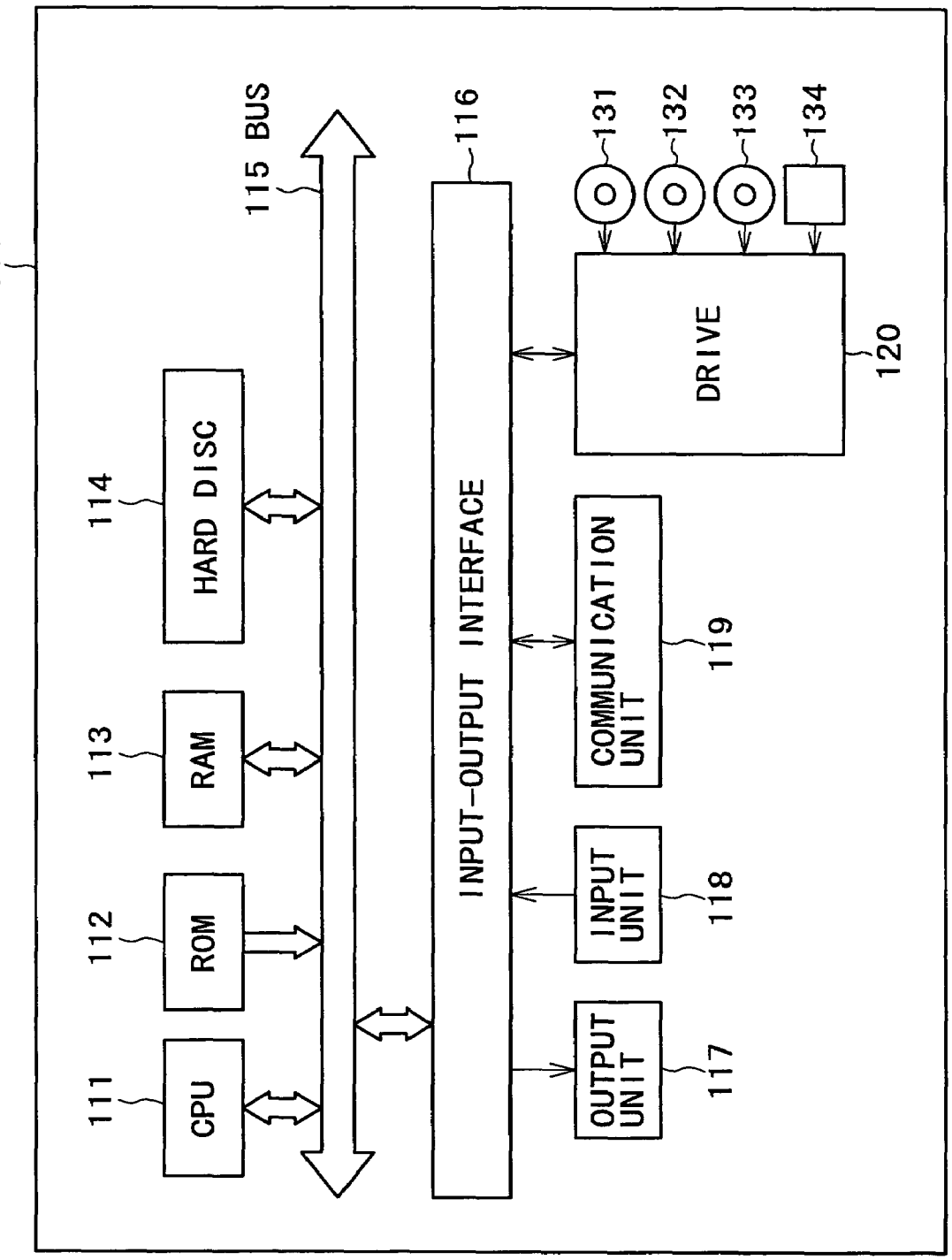

RECORDING APPARATUS AND METHOD, RECORDING MEDIUM, AND PROGRAM

BACKGROUND OF THE INVENTION

The present invention relates to an apparatus and a method for recording, a recording medium, and a program, and particularly to an apparatus and a method for recording, a recording medium, and a program that make it possible to perform consecutive recording efficiently.

A format for compressing video data and the like by a DV (Digital Video) system, for example, and recording the video data and the like onto magnetic tape is defined as a DV format for consumer digital videotape recorders.

In this format, for efficient consecutive recording, which is recording performed so as to connect newly inputted video with recorded video, data (system data) necessary for consecutive recording is arranged as a set for each predetermined number of pictures in a stage preceding the predetermined number of pictures.

In a case where video data to be recorded is an MPEG-PES (Packetized Elementary Stream), since size of one frame is variable, the video data and the like are temporarily stored on a storing medium such as a DRAM, and then recorded on a magnetic tape. Thus, in consecutive recording processing, detection of a consecutive recording start position and the like are performed by referring to the system data stored on the DRAM.

Conventionally, however, when recording started is paused, data stored on the DRAM at that time is erased. Therefore, when the recording is to be resumed, processing such for example as reading new video data (including system data) from the magnetic tape, storing the data on the DRAM, and calculating a consecutive recording start position from the system data stored on the DRAM is required. That is, conventionally, because the new video data is stored on the DRAM, the consecutive recording after the pause cannot be started quickly.

SUMMARY OF THE INVENTION

The present invention has been made in view of such a situation, and it is accordingly an object of the present invention to enable consecutive recording to be started quickly.

According to the present invention, there is provided a recording apparatus including: storing means for storing input video data on a storing medium as each piece of edit unit data including at least a predetermined number of frames and auxiliary data related to the frames; first registering means for subjecting the video data stored on the storing medium to error correction processing, determining for each piece of error correction processing unit data in the error correction processing whether the error correction processing unit data includes a head of the edit unit data, and registering a result of the determination as consecutive recording start allowing point information in a header of the error correction processing unit data; and recording means for recording, onto a magnetic tape, the video data including the header in which the consecutive recording start allowing point information is registered.

The recording apparatus further includes detecting means for storing predetermined video data recorded on the magnetic tape by the recording means on the storing medium as each piece of error correction processing unit data, and detecting a consecutive recording start point by referring to the consecutive recording start allowing point information registered in the header of the error correction processing unit data stored on the storing medium, wherein the storing means stores input video data on the storing medium as each piece of edit unit data so as to connect the video data from the consecutive recording start point detected by the detecting means; and the recording means records the video data stored on the storing medium and connected from the consecutive recording start point onto the magnetic tape.

The recording apparatus further includes second registering means for registering recording end point information in a header corresponding to a head of predetermined edit unit data stored on the storing medium and not recorded onto the magnetic tape when the storing of the video data on the storing medium by the storing means, the registering of the consecutive recording start allowing point information by the first registering means, and the recording of the video data onto the magnetic tape by the recording means are stopped in response to an instruction to temporarily stop the recording, wherein the storing means detects a consecutive recording start point by referring to the recording end point information, and stores input video data on the storing medium as each piece of edit unit data so as to connect the video data from the detected consecutive recording start point.

The header stores a parameter necessary for recording continuity, and the second registering means changes the parameter to ensure the recording continuity in consecutive recording from the recording end point.

According to the present invention, there is provided a recording method comprising: a storing step for storing input video data on a storing medium as each piece of edit unit data comprising at least a predetermined number of frames and auxiliary data related to the frames; a first registering step for subjecting the video data stored on the storing medium to error correction processing, determining for each piece of error correction processing unit data in the error correction processing whether the error correction processing unit data includes a head of the edit unit data, and registering a result of the determination as consecutive recording start allowing point information in a header of the error correction processing unit data; and a recording step for recording, onto a magnetic tape, the video data including the header in which the consecutive recording start allowing point information is registered.

According to the present invention, there is provided a program on a recording medium, the program including: a storing controlling step for controlling storing input video data on a storing medium as each piece of edit unit data including at least a predetermined number of frames and auxiliary data related to the frames; a first registering controlling step for subjecting the video data stored on the storing medium to error correction processing, determining for each piece of error correction processing unit data in the error correction processing whether the error correction processing unit data includes a head of the edit unit data, and controlling registering a result of the determination as consecutive recording start allowing point information in a header of the error correction processing unit data; and a recording controlling step for controlling recording, onto a magnetic tape, the video data including the header in which the consecutive recording start allowing point information is registered.

According to the present invention, there is provided a program including: a storing controlling step for controlling storing input video data on a storing medium as each piece of edit unit data including at least a predetermined number of frames and auxiliary data related to the frames; a first registering controlling step for subjecting the video data stored on the storing medium to error correction processing, determining for each piece of error correction processing unit data in the error correction processing whether the error correction processing unit data includes a head of the edit unit data, and controlling registering a result of the determination as consecutive recording start allowing point information in a header of the error correction processing unit data; and a recording controlling step for controlling recording, onto a magnetic tape, the video data including the header in which the consecutive recording start allowing point information is registered.

The recording apparatus and method and the program according to the present invention store input video data on a storing medium as each piece of edit unit data including at least a predetermined number of frames and auxiliary data related to the frames, subject the video data stored on the storing medium to error correction processing, determine for each piece of error correction processing unit data in the error correction processing whether the error correction processing unit data includes a head of the edit unit data, register a result of the determination as consecutive recording start allowing point information in a header of the error correction processing unit data, and record, onto a magnetic tape, the video data including the header in which the consecutive recording start allowing point information is registered.

According to the present invention, it is possible to perform consecutive recording properly.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 2 is a diagram showing a recorded state of video data and the like;

FIG. 5 is a diagram showing contents of an ECCTB;

FIG. 9 is a block diagram showing an example of configuration of a personal computer.

DETAILED DESCRIPTION OF THE PREFERRED EMBODIMENTS

Figure 1:
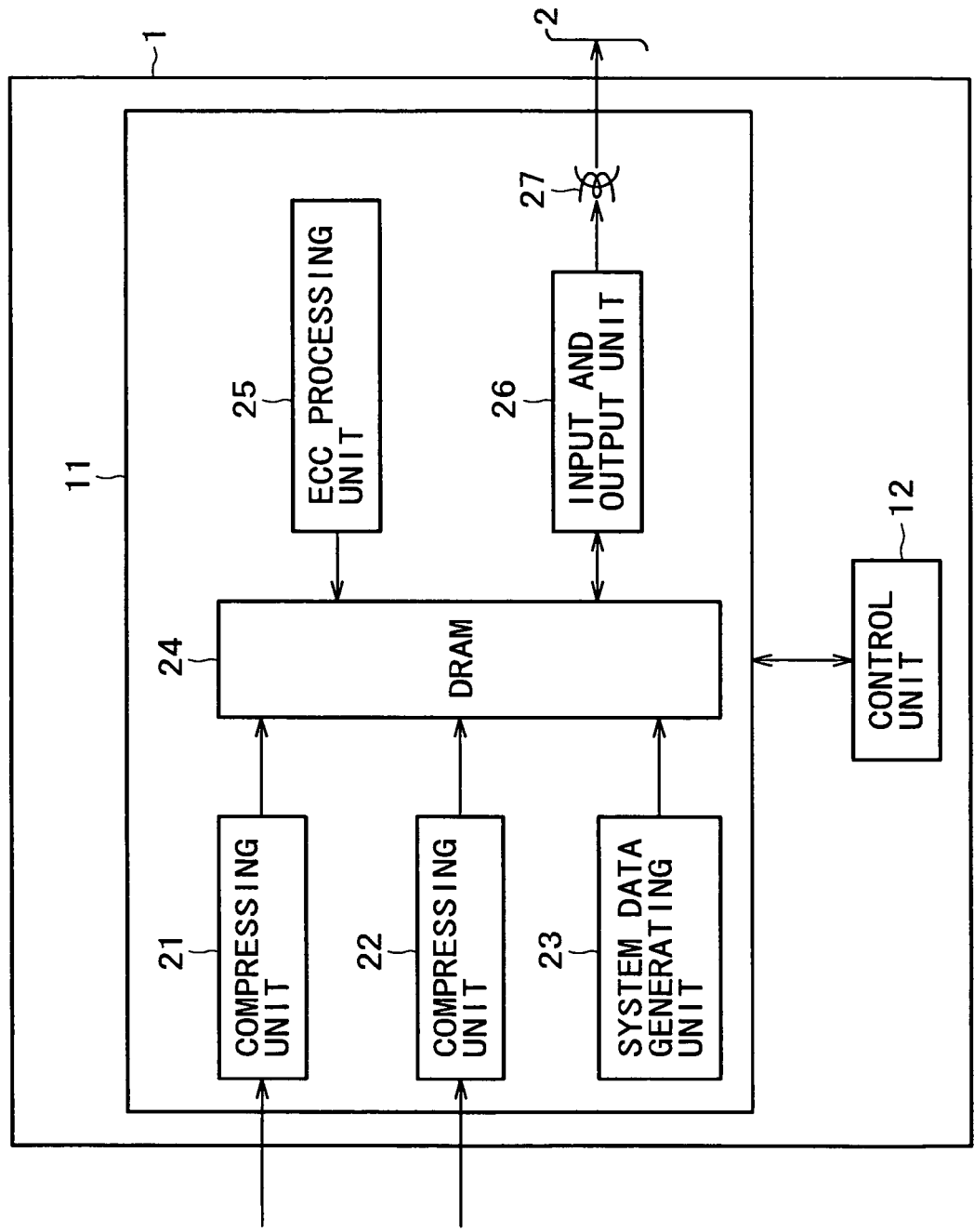
FIG. 1 is a block diagram showing an example of configuration of a recording apparatus to which the present invention is applied.

FIG. 1 shows an example of configuration of a recording apparatus 1 to which the present invention is applied.

The recording apparatus 1 records video data and audio data inputted thereto onto a magnetic tape 2 while forming a predetermined unit (hereinafter referred to as a pack) on a DRAM 24.

Figure 2:
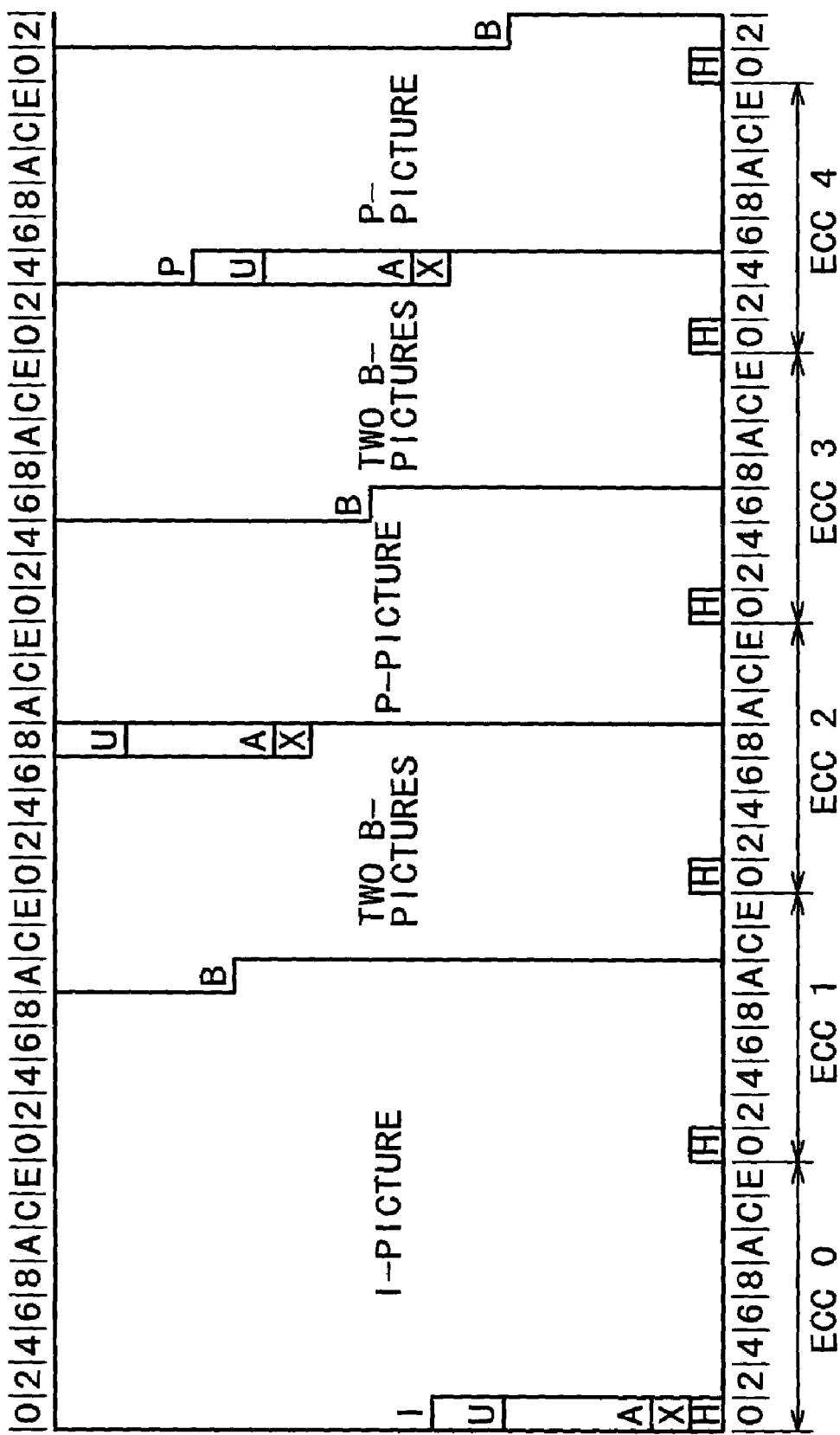

FIG. 2 shows a stored state on the DRAM 24 and a recorded state on the magnetic tape 2 of video data having a GOP structure with N=15 (an I-picture is arranged in every 15 pictures) and M=3 (a P-picture is arranged in every three pictures). That is, one pack comprises data of M (in this case, three) pictures, AUX data (AUX-V) (denoted by U in FIG. 2) related to the pictures, audio data (denoted by A in FIG. 2) corresponding to the pictures, and AUX data (AUX-A) (denoted by X in FIG. 2) related to the audio data.

The order of data arranged in each pack is AUX-A (X in FIG. 2), audio data (A in FIG. 2), AUX-V (U in FIG. 2), and three pictures. The AUX data (AUX-A and AUX-V) and audio data corresponding to the three pictures are arranged as a set at a head of the pack (in a stage preceding the pictures).

The recording apparatus 1 subjects the data stored on the DRAM 24 (FIG. 2) to ECC (error correcting code) processing with data of 16 tracks as one unit, for example, and disposes an ECCTB (H in FIG. 2) (so-called header) storing predetermined information in a first track of every 16 tracks. Incidentally, data of every 16 tracks as a unit of ECC processing will be referred to as an ECC bank.

When a head of a pack that can be a start point of consecutive recording is included in an ECC bank, data indicating this is set in the ECCTB. When a head of a pack that can be a start point of consecutive recording is not included in the ECC bank, data indicating this is set in the ECCTB. Thus, a consecutive recording start allowing point is registered in an ECCTB.

When performing consecutive recording, the recording apparatus 1 refers to contents of ECCTBs to detect a consecutive recording start allowing point closest to a point where a user desires to start consecutive recording, and starts the consecutive recording at the detected point.

The configuration of the recording apparatus 1 will next be described. The recording apparatus 1 roughly comprises a recording processing unit 11 and a control unit 12.

A compressing unit 21 of the recording processing unit 11 compresses an HD video signal inputted thereto by an MPEG system such for example as MP@HL or MP@H-14, and then outputs video data obtained as a result of the compression to the DRAM 24. A compressing unit 22 compresses an audio signal corresponding to the HD video signal by a system conforming to MPEG1 layer 2 or AAC, for example, and then outputs audio data obtained as a result of the compression to the DRAM 24.

A system data generating unit 23 generates system data comprising AUX data, subcode data and the like, and outputs the system data to the DRAM 24.

The video data outputted from the compressing unit 21, the audio data outputted from the compressing unit 22, and the system data outputted from the system data generating unit 23 are stored on the DRAM 24 so as to form packs (FIG. 2). Incidentally, the DRAM 24 can store data for six ECC banks, and when there is an input exceeding the amount, the input data is stored by sequentially overwriting previously stored data.

An ECC processing unit 25 subjects the video data, the audio data, and the system data stored on the DRAM 24 and comprising packs to ECC processing for each ECC bank. The ECC processing unit 25 also subjects data read from the magnetic tape 2 and stored on the DRAM 24 by an input and output unit 26 to error correcting processing and the like.

The input and output unit 26 modulates data (data after being subjected to ECC processing) stored on the DRAM 24 to a form suitable for recording on the magnetic tape 2, and records the data on the magnetic tape 2 via a rotary head 27.

The input and output unit 26 also stores, on the DRAM 24, data read from the magnetic tape 2 via the rotary head 27.

The control unit 12 controls each part of the recording processing unit 11.

Processing for registering a consecutive recording start allowing point will next be described with reference to a flowchart of FIG. 3. Incidentally, in this example, a consecutive recording start allowing point is registered at a time of recording input data.

At a step S1, the control unit 12 starts processing for storing video data, audio data, and AUX outputted from the compressing unit 21, the compressing unit 22, and the system data generating unit 23 on the DRAM 24 so as to form a pack.

At a next step S2, the control unit 12 starts processing for registering a consecutive recording start allowing point in an ECCTB (H in FIG. 2) for the pack stored on the DRAM 24. Details of the processing at this step will be described later.

At a step S3, the control unit 12 controls the ECC processing unit 25 and the input and output unit 26 to start subjecting the pack on the DRAM 24 which pack has the consecutive recording start allowing point registered therein by the processing at the step S2 to ECC processing for each ECC bank and recording data obtained as a result of the ECC processing onto the magnetic tape 2.

The details of the processing for registering a consecutive recording start allowing point, which processing is started at the step S2 in FIG. 3, will be described with reference to a flowchart of FIG. 4.

Figure 3:
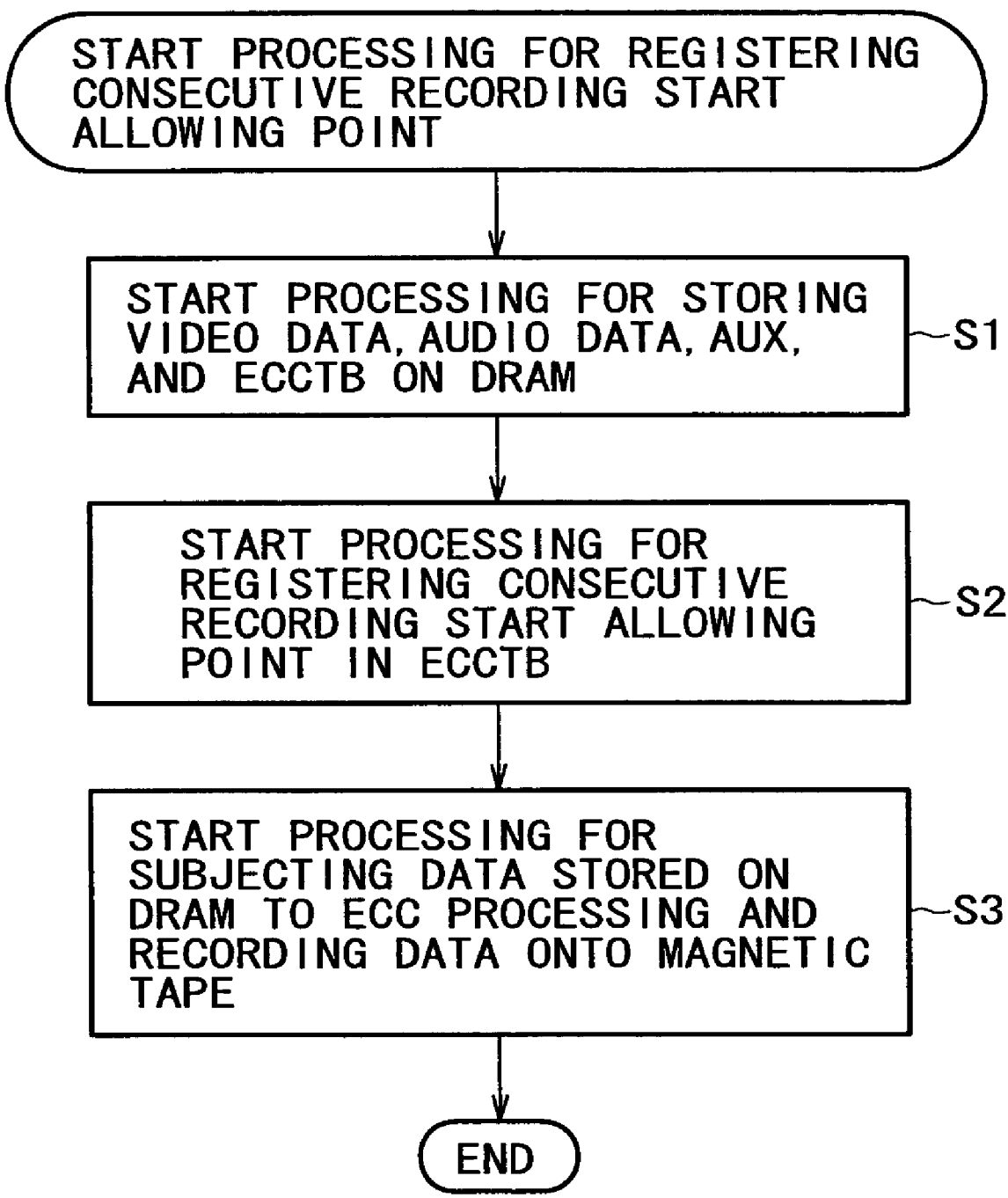
FIG. 3 is a flowchart of assistance in explaining processing for registering a consecutive recording start allowing point.
Figure 4:
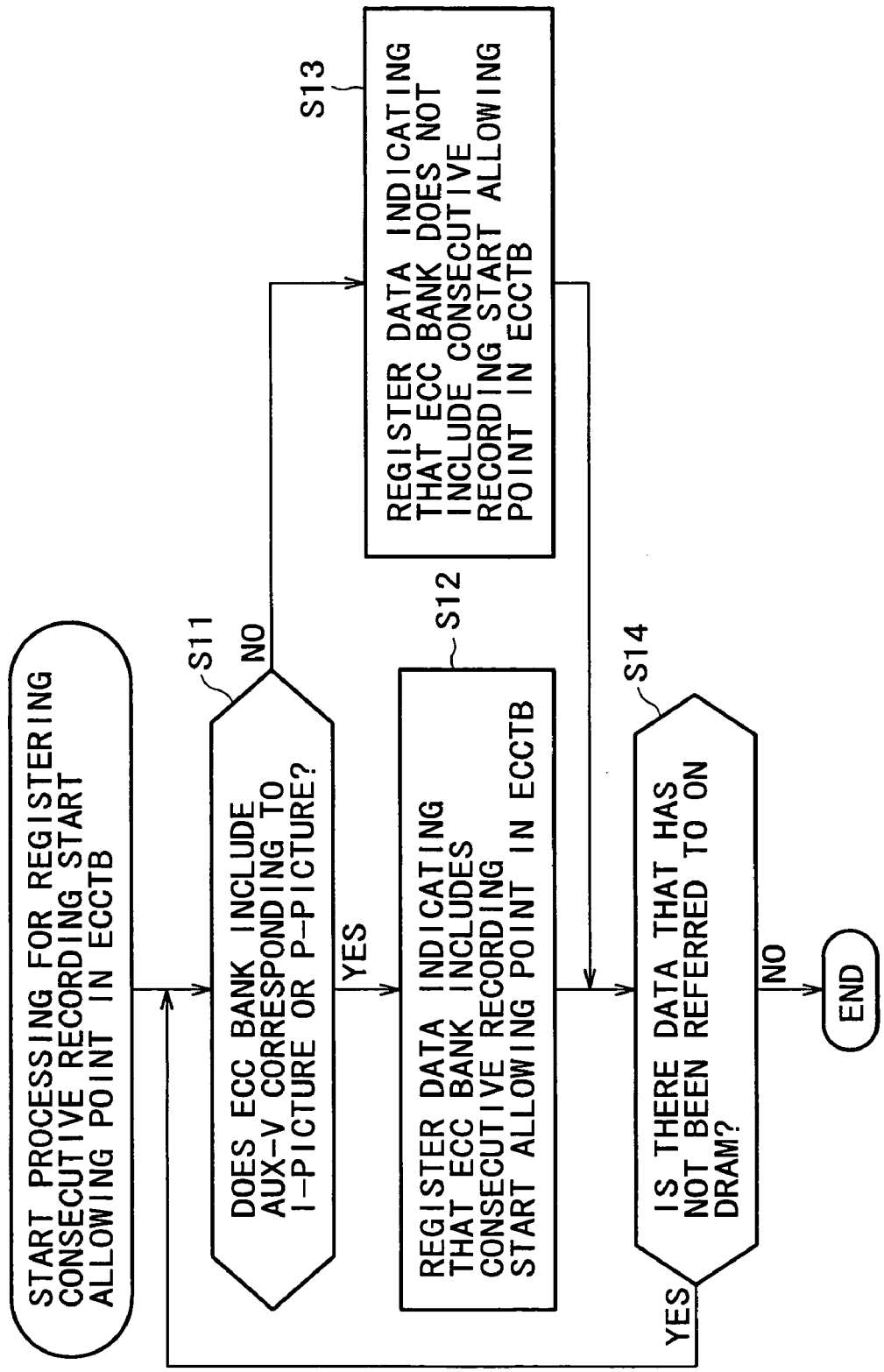
FIG. 4 is a flowchart of assistance in explaining details of processing started at a step S2 in FIG. 3.

At a step S11, the control unit 12 refers to data of an ECC bank (for 16 tracks) stored on the DRAM 24 by the processing at the step S1 in FIG. 3, and determines whether the ECC bank includes a head of a pack that can be a consecutive recording start point.

Since video can be connected from an I-picture or a P-picture, and AUX is arranged as a set at a head of a pack, the control unit 12 determines in this case whether the ECC bank includes AUX-V corresponding to an I-picture or a P-picture.

When the control unit 12 at the step S11 determines that the ECC bank includes a head of a pack that can be a consecutive recording start point, that is, determines that the ECC bank includes AUX-V corresponding to an I-picture or a P-picture, the processing proceeds to a step S12.

At the step S12, the control unit 12 registers data indicating that the ECC bank referred to at the step S11 includes a head of a pack that can be a consecutive recording start point in the ECCTB of the ECC bank. Specifically, DATA-H indicating a picture (I-picture or P-picture) to which the AUX-V corresponds, a head position of the pack (track number where AUX-A is disposed), and a DTS (Decoding Time Stamp), vbv_delay, and continuity counter included in the AUX-V are set in an editable header map of the ECCTB, as shown in FIG. 5.

By thus setting the predetermined data in the editable header map of the ECCTB, the consecutive recording start allowing point is registered.

Incidentally, two consecutive recording start allowing points can be registered in the editable header map of the ECCTB. Hence, when one ECC bank includes heads of two or more packs that can be consecutive recording start allowing points, that is, when one ECC bank includes two or more pieces of AUX-V each corresponding to an I-picture or a P-picture, head positions of two packs of the two or more packs and the like can be set in the editable header map of the ECCTB to register the two consecutive recording start allowing points.

Returning to FIG. 4, when the control unit 12 determines at the step S11 that the ECC bank does not include AUX-V corresponding to an I-picture or a P-picture, the processing proceeds to a step S13. At the step S13, the control unit 12 registers data indicating that the ECC bank referred to at the step S11 does not include a head of a pack that can be a consecutive recording start point in the ECCTB of the ECC bank. Specifically, DATA-H indicating that the ECC bank does not include a pack that can be a consecutive recording start point (hereinafter referred to as No Editable) is set in the editable header map of the ECCTB.

After registering the data indicating that the ECC bank includes a pack that can be a consecutive recording start point (consecutive recording start allowing point) at the step S12, or registering the data indicating that the ECC bank does not include a pack that can be a consecutive recording start point at the step S13, the processing proceeds to a step S14. At the step S14, the control unit 12 determines whether there is an ECC bank that has not been referred to on the DRAM 24. When the control unit 12 determines at the step S14 that there is an ECC bank that has not been referred to on the DRAM 24, the processing returns to the step S11 to perform the processing from the step S11 on down. When the control unit 12 determines at the step S14 that there is no ECC bank that has not been referred to on the DRAM 24, the processing is ended.

Operation of the recording apparatus 1 when performing consecutive recording will next be described with reference to a flowchart of FIG. 6.

At a step S31, the control unit 12 obtains a consecutive recording start position desired by the user. In the case of this example, the user refers to images displayed by fast-forward reproduction, and stops the fast-forward reproduction when finding an image where consecutive recording is desired to be started. Thus, the control unit 12 obtains a position of the magnetic tape 2 at which position the rotary head 27 is in contact with the magnetic tape 2 at that time (a distance ATN (Absolute Track Number) from the start of the magnetic tape 2) as the consecutive recording start position desired by the user.

At a next step S32, the control unit 12 controls a mechanical deck unit (not shown) to rewind the magnetic tape 2 to return by a predetermined number of tracks (for example 220 tracks) from the position of the magnetic tape 2 at the time of stopping the fast-forward reproduction, and controls the input and output unit 26 to start reading data for each ECC bank stored on the magnetic tape 2 from that position and storing the data on the DRAM 24.

At this time, the control unit 12 also controls the ECC processing unit 25 to start error correcting processing on the data stored on the DRAM 24.

At a step S33, the control unit 12 reads an ECCTB (H in FIG. 2) from one ECC bank on the DRAM 24 which data is made readable by being error-corrected by the processing at the step S32. At a step S34, the control unit 12 determines whether DATA-H set in the ECCTB indicates that the ECC bank includes a head of a pack that can be a consecutive recording start point (includes a consecutive recording start allowing point). When the control unit 12 determines at the step S34 that the DATA-H set in the ECCTB indicates that the ECC bank does not include a consecutive recording start allowing point, the processing returns to the step S33 to read a next ECCTB.

When the control unit 12 determines at the step S34 that the DATA-H set in the ECCTB indicates that the ECC bank includes a consecutive recording start allowing point, the processing proceeds to a step S35. At the step S35, the control unit 12 detects an ETN indicating the tape position in different units from the absolute position ATN obtained at the step S31, and calculates a DTS according to the following equation from the ETN. Incidentally, a clock number in the equation is 3003 in the case of NTSC, and is 3600 in the case of PAL.

$$DTS=(ETN-10)\times(\text{clock number}/10)$$

Also, the control unit 12 compares the DTS calculated at the step S35 with a DTS set in the ECCTB read at the step S33, and determines at a step S36 whether a difference between the DTSs is smaller than a predetermined magnitude. When the control unit 12 determines at the step S36 that the difference between the DTSs is smaller than the predetermined magnitude, the processing proceeds to a step S37.

At the step S37, the control unit 12 stops the processing of reading data, the processing of storing the data on the DRAM 24, and the ECC processing started at the step S32, and brings the recording apparatus 1 into a recording standby state.

At a next step S38, the control unit 12 calculates an amount of return of the magnetic tape 2 to set the position of the magnetic tape 2 to the head position of the pack set as the consecutive recording start allowing point in the editable header map of the ECCTB read at the step S33, from the current position of the magnetic tape 2 (the position of the magnetic tape 2 at the time of stopping the fast-forward reproduction) and the head position of the pack. At a step S39, the control unit 12 rewinds the magnetic tape 2 by the calculated amount.

At a next step S40, the control unit 12 calculates, from information within the ECCTB, initial parameters required for recording to be started after cancellation of the recording standby state and parameters that need to be inherited by a new stream.

At a step S41, the control unit 12 calculates a position for starting consecutive recording in sync block units. At a step S42, in order to secure continuity of subcode to be newly recorded, the control unit 12 generates subcode for a period from the time of the head of the ECC bank to which the ECCTB read at the step S33 belongs to the tape DTS time, using system data of the ECCTB read at the step S33 and an ECCTB of an ECC bank (stored on the DRAM 24) immediately preceding the ECC bank to which the ECCTB read at the step S33 belongs.

At a next step S43, the control unit 12 stands by until an instruction to start recording is inputted. When the instruction is inputted, the processing proceeds to a step S44.

Figure 7:
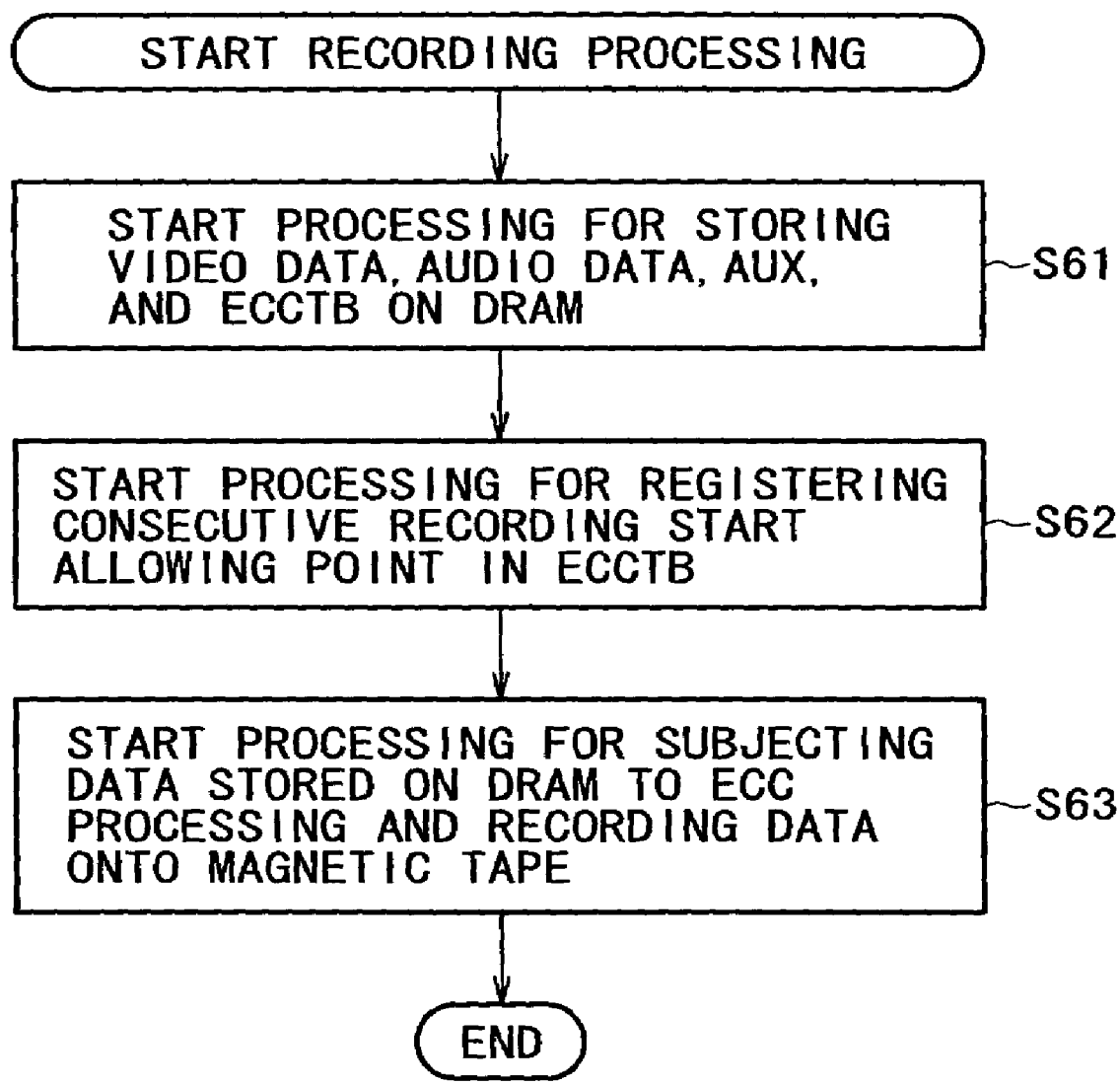
FIG. 7 is a flowchart of assistance in explaining details of processing started at a step S44 in FIG. 6.
Figure 8:
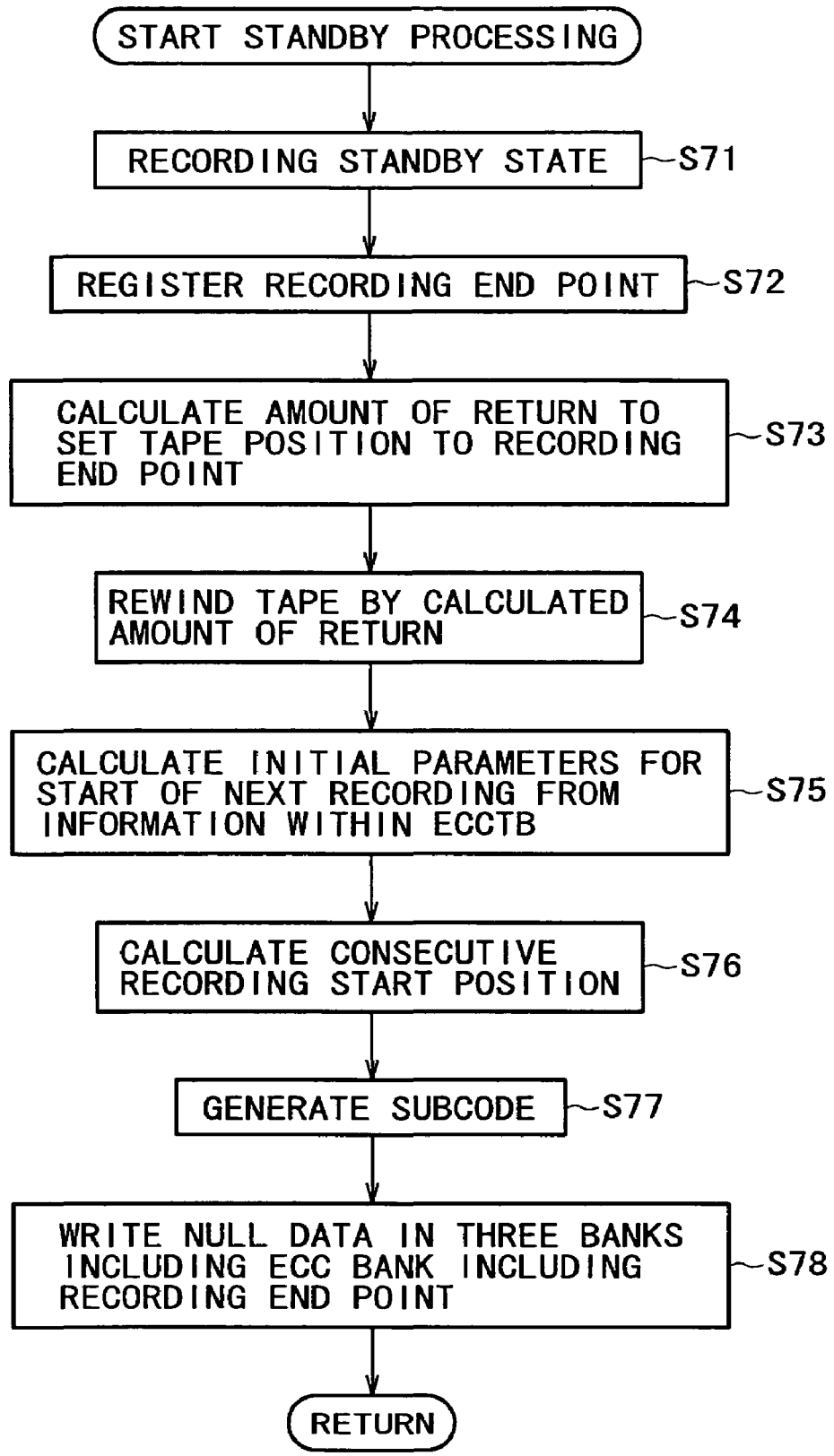
FIG. 8 is a flowchart of assistance in explaining details of processing at a step S46 in FIG. 6.

At the step S44, the control unit 12 controls the recording processing unit 11 to start processing for recording an input signal on the basis of the data generated by the processing at the steps S40 to S42 or a step S46 (steps S75 to S77 in FIG. 8) to be described later. That is, consecutive recording is thereby performed from the consecutive recording start allowing point detected at the step S34. Though details of the recording processing at the step S44 are shown in a flowchart of FIG. 7, substantially the same processing as the processing for registering a consecutive recording start allowing point which processing is represented in the flowchart of FIG. 3 is performed at the step S44, and therefore description thereof will be omitted.

At a next step S45, the control unit 12 determines whether an instruction to pause recording is inputted. When the control unit 12 determines that the instruction is inputted, the processing proceeds to a step S46. Details of the processing at the step S46 are shown in a flowchart of FIG. 8.

Specifically, at a step S71, the control unit 12 stops the recording processing started at the step S44, and sets the recording apparatus 1 in a recording standby state. That is, the storing of input data on the DRAM 24 (step S61 in FIG. 7) and the like are thereby stopped.

At a step S72, the control unit 12 changes DATA-H set in an ECCTB of an ECC bank that is stored on the DRAM 24 and would be recorded next if the recording were not stopped to data indicating that the ECC bank includes a recording end point, and sets the position of the recording end point and the like in the ECCTB.

Figure 6:
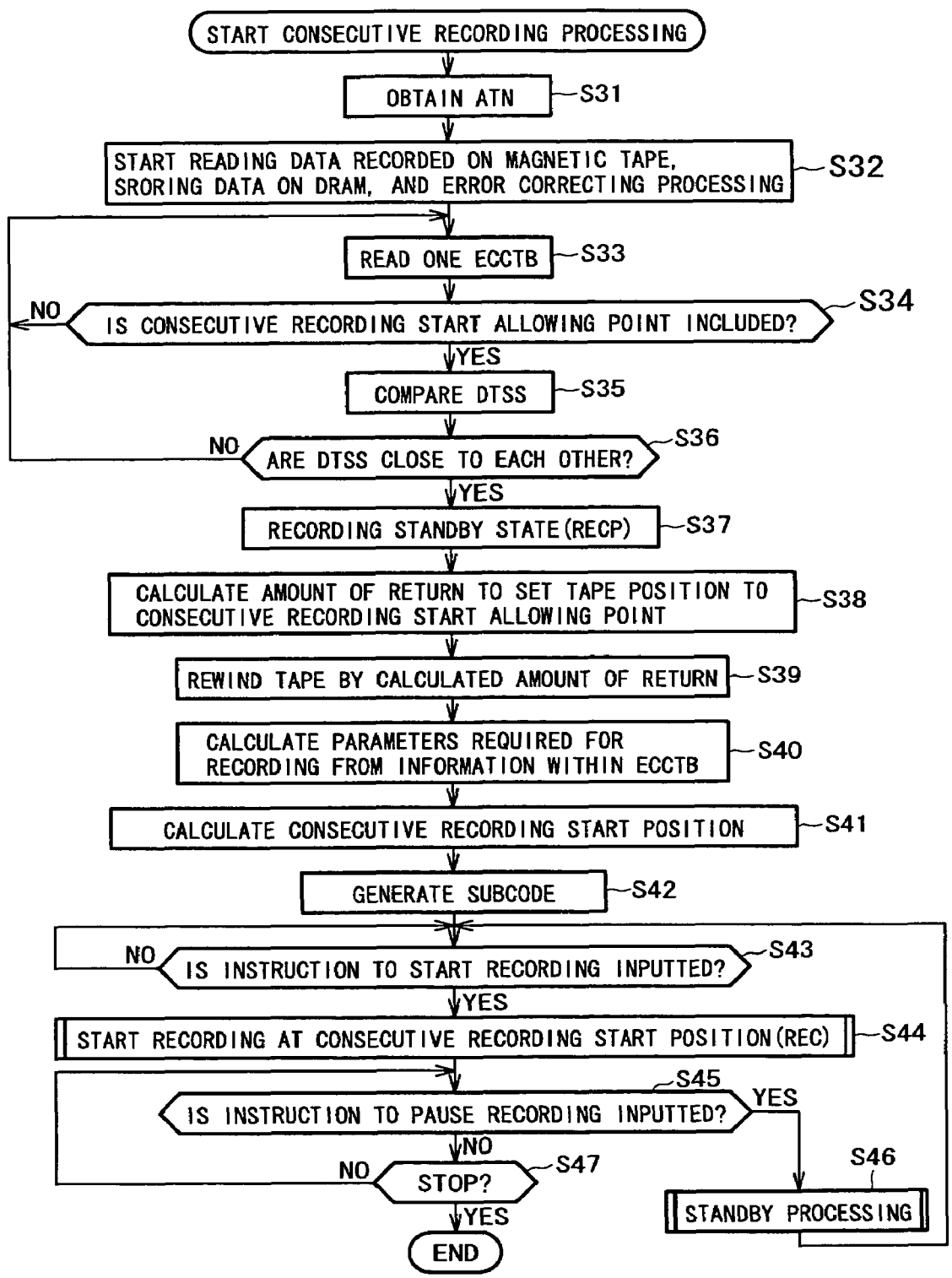
FIG. 6 is a flowchart of assistance in explaining consecutive recording processing.

Incidentally, while according to the above description of the processing at the step S34 in FIG. 6, the processing proceeds to the step S35 when a consecutive recording allowing point is registered, the processing can proceed to the step S35 also when the recording end point is registered.

At a step S73, the control unit 12 calculates an amount of return of the magnetic tape 2 to set the position of the magnetic tape 2 to a position corresponding to the recording end point set in the ECCTB at the step S72, from the current position of the magnetic tape 2 and the position of the recording end point. At a step S74, the control unit 12 rewinds the magnetic tape 2 by the calculated amount.

At a next step S75, the control unit 12 calculates, from information within the ECCTB, initial parameters required for recording to be started after cancellation of the recording standby state and parameters that need to be inherited by a new stream.

At a step S76, the control unit 12 calculates a position for starting consecutive recording in sync block units. At a step S77, in order to secure continuity of subcode to be newly recorded, the control unit 12 generates subcode for a period from the time of the head of the ECC bank to which the ECCTB including the DATA-H changed to the data indicating the recording end point at the step S72 belongs to the tape DTS time, using system data of the ECCTB including the DATA-H changed at the step S72 and an ECCTB of an ECC bank (stored on the DRAM 24) immediately preceding the ECC bank to which the ECCTB including the DATA-H changed at the step S72 belongs.

At a next step S78, the control unit 12 stores NULL data in three ECC banks including the ECC bank including the recording end point on the DRAM 24. The processing then returns to the step S43 in FIG. 6, where the control unit 12 stands by until an instruction to start recording is inputted.

Thus, when recording is paused, the data (ECCTB) stored on the DRAM 24 at that time is retained without being erased, and the rewinding of the magnetic tape 2 (step S74) and the calculation of necessary data (steps S75 to S77) are performed before the recording is resumed. It is therefore possible to start consecutive recording quickly after cancellation of the recording standby state.

When the control unit 12 determines at the step S45 that no instruction to pause recording is inputted, the control unit 12 proceeds to a step S47 to determine whether an instruction to end recording is inputted. When the control unit 12 determines at the step S47 that no instruction to end recording is inputted, the processing returns to the step S45 to perform the processing from the step S45 on down. When an instruction to end recording is inputted at the step S47, on the other hand, the consecutive recording processing is ended.

It is to be noted that for simplicity of the description above, when the DATA-H indicates that the ECC bank includes a head of a pack that can be a consecutive recording start point at the step S34, the processing proceeds to the step S35 to perform the processing and consideration therefor from the step S35 on down; in practice, however, if a value of Edit Status of the ECCTB (FIG. 5) is 0 or 1, it is determined that even when the DATA-H indicates that the ECC bank includes a head of a pack that can be a consecutive recording start point, it cannot be a consecutive recording start point, and the processing returns to the step S33.

The Edit Status is a variable counting from 0 up to 7f. The Edit Status is initialized to 0 when starting from Edit Pack Pair (Edit AUX-V) and to 1 when starting from TOP AUX-V.

The series of processes described above can be carried out not only by hardware but also by software. When the series of processes is to be carried out by software, a program forming the software is installed from a recording medium onto a computer that is incorporated in special hardware, or for example a general-purpose personal computer that can perform various functions by installing various programs thereon.

As shown in FIG. 9, the recording medium is not only formed by packaged media distributed to users to provide the program separately from a personal computer 101, the packaged media comprising a magnetic disk 131 (including floppy disks), an optical disk 132 (including CD-ROM (Compact Disk-Read Only Memory) and DVD (Digital Versatile Disk)), a magneto-optical disk 133 (including MD (Mini-Disk)), a semiconductor memory 134 or the like which has the program recorded thereon, but also formed by a ROM, a hard disk or the like which has the program recorded thereon and which is provided to the user in a state of being preincorporated in the apparatus proper.

It is to be noted that in the present specification, the steps describing the program recorded on the recording medium include not only processing carried out in time series in the described order but also processing carried out in parallel or individually and not necessarily in time series.

While the preferred embodiments of the present invention have been described using the specific terms, such description is for illustrative purposes only, and it is to be understood that changes and variations may made without departing from the spirit or scope of the following claims.

What is claimed is:

1. A recording apparatus comprising:
storing means for storing input video data on a storing medium as respective pieces of edit unit data formed of a predetermined number of frames and auxiliary data related to said frames;
first registering means for subjecting said pieces of edit unit data stored on said storing medium to error correction processing, determining for each piece of error correction processed unit data whether said error correction processed unit data includes a head of said edit unit data, and registering a result of the determination as consecutive recording start allowing point information in a header of said error correction processing unit data;
recording means for recording on a magnetic tape said video data including said header in which said consecutive recording start allowing point information is registered; and
second registering means for registering recording end point information in said header corresponding to a head of a predetermined one of said edit unit data stored on said storing medium and not recorded onto said magnetic tape when storing of said video data on said storing medium by said storing means, the registering of said consecutive recording start allowing point information by said first registering means, and the recording of said video data onto said magnetic tape by said recording means are stopped in response to an instruction to temporarily stop the recording,
wherein said storing means detects a consecutive recording start point by referring to said recording end point information, and stores input video data on said storing medium as each piece of said edit unit data so as to connect the video data from the detected said consecutive recording start point.

2. The recording apparatus as claimed in claim 1, further comprising detecting means for storing said video data recorded on said magnetic tape by said recording means on said storing medium as pieces of said error correction processed unit data and for detecting a consecutive recording start point by referring to said consecutive recording start allowing point information registered in said header of said error correction processing unit data stored on said storing medium,
wherein said storing means stores said input video data on said storing medium as respective pieces of said edit unit data so as to connect the video data from said consecutive recording start point detected by said detecting means
and said recording means records said video data stored on said storing medium and connected from said consecutive recording start point onto said magnetic tape.

3. The recording apparatus as claimed in claim 1,
wherein said header stores a parameter necessary for recording continuity; and
said second registering means changes said parameter to ensure said recording continuity in consecutive recording from said recording end point.

4. A magnetic tape recording method comprising:
a storing step for storing input video data on a storing medium as respective pieces of edit unit data formed of a predetermined number of frames and auxiliary data related to said frames;
a first registering step for subjecting said pieces of edit unit data stored on said storing medium to error correction processing, determining for each piece of error correction processed unit data whether said error correction processed unit data includes a head of said edit unit data and registering a result of the determination as consecutive recording start allowing point information in a header of said error correction processing unit data;
a recording step for recording on a magnetic tape said video data including said header in which said consecutive recording start allowing point information is registered; and
a second registering step for registering recording end point information in said header corresponding to a head of a predetermined one of said edit unit data stored on said storing medium and not recorded onto said magnetic tape when storing of said video data on said storing medium during said storing step, the registering of said consecutive recording start allowing point information during said first registering step, and the recording of said video data onto said magnetic tape during said recording step are stopped in response to an instruction to temporarily stop the recording,
wherein during said storing step a consecutive recording start point is detected by referring to said recording end point information, and input video data is stored on said storing medium as each piece of said edit unit data so as to connect the video data from the detected said consecutive recording start point.

5. A computer-readable medium on which a program is recorded, said program being operable to perform a recording method comprising:

a storing controlling step for controlling storing input video data on a storing medium as respective pieces of edit unit data formed of a predetermined number of frames and auxiliary data related to said frames;

a first registering controlling step for subjecting said pieces of edit unit data stored on said storing medium to error correction processing, determining for each piece of error correction processed unit data whether said error correction processed unit data includes a head of said edit unit data, and controlling registering a result of the determination as consecutive recording start allowing point information in a header of said error correction processing unit data;

a recording controlling step for controlling recording on a magnetic tape said video data including said header in which said consecutive recording start allowing point information is registered; and a second registering controlling step for registering recording end point information in said header corresponding to a head of a predetermined one of said edit unit data stored on said storing medium and not recorded onto said magnetic tape when storing of said video data on said storing medium during said storing controlling step, the registering of said consecutive recording start allowing point information during said first registering controlling step, and the recording of said video data onto said magnetic tape during said recording controlling step are stopped in response to an instruction to temporarily stop the recording, wherein during said storing controlling step a consecutive recording start point is detected by referring to said recording end point information, and input video data is stored on said storing medium as each piece of said edit unit data so as to connect the video data from the detected said consecutive recording start point.

6. A recording apparatus for storing input video data, one frame of which is variable, on a storing medium as respective pieces of edit unit data formed of at least a predetermined number of frames and auxiliary data related to said frames;

determining, for each piece of error correction processed unit data of said video data subjected to error correction on said storing medium, whether said error correction processed unit data includes a head of said edit unit data, and when determining that more than one head of said edit unit data is included, registering an information included a Decoding Time Stamp which can be calculated, based on clock number, from information indicating a tape position detected from an absolute position, as consecutive recording start allowing point information in a header of said error correction processing unit data, and when determining that no head of said edit unit data is included, processing for registering an information, indicating that no consecutive recording start allowing point information is included, as consecutive recording start allowing point information in a header of said error correction processing unit data;

recording on a magnetic tape said video data processed said error correction and registered in said header said consecutive recording start allowing point information; and storing said video data recorded on said magnetic tape so as to connect the video data, the apparatus comprising:

detecting means for, in consecutive recording processing, reading predetermined said video data recorded on said magnetic tape and storing the video data on said storing medium as each piece of said error correction processing unit data by referring to said consecutive recording start allowing point information registered in said header of said error correction processing unit data stored on said storing medium, and detecting a recording start allowing point;

storing means for, when a difference between a Decoding Time Stamp of an image where consecutive recording is desired to be started and a read Decoding Time Stamp included in said consecutive recording start allowing point information registered in the header of said error correction processing unit data, is smaller than a predetermined magnitude, storing, so as to connect the video data detected from the said consecutive recording start point, input video data as the image where consecutive recording is desired, on the storing medium as each piece of edit unit data; and recording means for recording onto said magnetic tape said video data stored on said storing medium and connected from said consecutive recording start point.

* * * * *